United States Patent
Manchanda et al.

(10) Patent No.: US 9,992,751 B1
(45) Date of Patent: Jun. 5, 2018

(54) MINIMIZING INTERFERENCE CAUSED BY HIGH-POWERED UPLINK TRANSMISSIONS FROM RELAY DEVICES

(71) Applicant: Spring Spectrum LP, Overland Park, KS (US)

(72) Inventors: Nitesh Manchanda, Overland Park, KS (US); Vanil Parihar, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days. days.

(21) Appl. No.: 15/605,017

(22) Filed: May 25, 2017

(51) Int. Cl.
| | |
|---|---|
| *H04B 7/185* | (2006.01) |
| *H04W 52/24* | (2009.01) |
| *H04W 52/14* | (2009.01) |
| *H04W 52/34* | (2009.01) |
| *H04B 7/155* | (2006.01) |
| *H04M 3/00* | (2006.01) |
| *H04W 4/00* | (2018.01) |
| *H04W 24/00* | (2009.01) |
| *H04W 36/00* | (2009.01) |

(52) U.S. Cl.
CPC ...... *H04W 52/243* (2013.01); *H04B 7/15507* (2013.01); *H04W 52/146* (2013.01); *H04W 52/245* (2013.01); *H04W 52/34* (2013.01)

(58) Field of Classification Search
CPC ............. H04W 52/243; H04W 52/244; H04W 52/245; H04W 52/246; H04W 52/247; H04W 52/248; H04W 52/146; H04B 7/15507; H04B 7/155014
USPC ........................................................ 455/13.1
See application file for complete search history.

(56) References Cited

U.S. PATENT DOCUMENTS

| | | | |
|---|---|---|---|
| 9,432,991 B2 | 8/2016 | Khandekar et al. | |
| 2013/0322322 A1* | 12/2013 | Redana ................. | H04W 24/10 370/315 |
| 2015/0358940 A1* | 12/2015 | Zhang .................... | H04W 4/06 370/312 |

* cited by examiner

*Primary Examiner* — Huy C Ho (57) ABSTRACT

Systems, methods, and processing nodes for minimizing interference caused by high-powered wireless devices to other wireless devices in the network by identifying a high-powered relay device attached to a first access node, instructing a second access node to report interference caused by the high-powered relay device to uplink transmissions received at the second access node, receiving an indicator of interference from the second access node, and instructing the first access node to deactivate a high-powered transmission mode of the high-powered relay device.

18 Claims, 8 Drawing Sheets

MINIMIZING INTERFERENCE CAUSED BY HIGH-POWERED UPLINK TRANSMISSIONS FROM RELAY DEVICES

TECHNICAL BACKGROUND

As wireless networks evolve and grow in complexity, there are ongoing challenges associated with reaching targeted coverage levels. Recently, in an effort to boost coverage and enhance throughput in wireless networks, network operators have proposed deployment of wireless devices capable of transmitting at a maximum allowable transmission power that is higher than a current maximum allowable transmission power of off-the-shelf wireless devices and/or other currently deployed standard or low powered wireless devices.

As shown in Table 1 below, the maximum allowable transmission power for wireless devices can be defined by the power class of the wireless device.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, the maximum allowable transmission power level and tolerance (i.e., power error limits) with which wireless devices can transmit data on a given frequency band or sub-band (e.g., bands I-III) can be specified based on a pre-defined power class (e.g., power classes 1-4 illustrated in Table 1) of the wireless device rather than a physical maximum transmit capability of the wireless device. Off-the-shelf and/or other standard-powered (or low-powered) wireless devices are currently defined in LTE as power class 3 and/or power class 4 wireless devices. Power class 3 and/or power class 4 low-powered wireless devices can be configured with a maximum allowable transmission power level of +23 dBm for frequency bands I-III with a nominal power tolerance of ±2 dB (e.g., for E-UTRA bands). High-powered wireless devices are currently defined as power class 1 or power class 2 wireless devices. Power class 1 and/or power class 2 high-powered wireless devices can be configured with a maximum allowable transmission power level of +26 dBm for frequency bands I-II with a nominal power tolerance±2 dB (e.g., for E-UTRA bands), as illustrated in Table 1.

Introducing additional high-powered wireless devices into a wireless network can negatively affect uplink system performance. For example, transmissions from standard-powered wireless devices (uplink transmissions) as well as signals received at the standard-powered wireless devices (downlink transmissions) may each be subject to interference caused by uplink transmissions from high-powered wireless devices operating in a high-powered transmission mode, particularly when both standard and high-powered wireless devices are operating on the same frequency band or sub-band.

Overview

Exemplary embodiments described herein include systems, methods, and processing nodes for minimizing interference that may potentially be caused by high-powered relay wireless devices operating in a high-powered transmission mode. Exemplary methods for minimizing interference include determining that a relay wireless device is operating in a high-powered transmission mode, wherein the relay wireless device is configured to relay data between a serving access node and an end-user wireless device, determining that an interference level of uplink signals received at a neighboring access node in communication with the serving access node meets a threshold, and deactivating the high-powered transmission mode of the relay wireless device. The high-powered transmission mode utilizes a first transmission power level that is associated with a high power class.

Exemplary systems for minimizing interference include a processing node that is configured to perform operations including determining that a relay wireless device assigned a high power class is attached to a first access node, wherein the high power class enables a high uplink transmission power level, transmitting an instruction to a second access node to monitor a signal level of uplink transmissions received at the second access node, wherein the second access node is communicably coupled to the first access node, receiving an indicator of a low signal level from the second access node, and transmitting an instruction to the relay wireless device to utilize a low uplink transmission level.

Exemplary processing nodes for minimizing interference configured to perform operations including identifying a high-powered relay device attached to a first access node, instructing a second access node to report interference caused by the high-powered relay device to uplink transmissions received at the second access node, receiving an indicator of interference from the second access node, and instructing the first access node to deactivate a high-powered transmission mode of the high-powered relay device.

DETAILED DESCRIPTION

Minimizing interference in a wireless network as described herein includes selectively activating and deactivating a high-powered transmission mode of relay wireless devices attached to serving access nodes in the wireless network. A relay wireless device attached to a serving access node is configured to relay data between the serving access node and an end-user wireless device via a backhaul connection. The relay wireless device may be assigned a high power class, which enables operating in a high-powered transmission mode. The power class may be obtained from an attach request received at the serving access node from the relay wireless device. In the high-powered transmission mode, a transmission power level for uplink transmissions generated by the relay wireless device can be higher than a maximum transmission power level generated by relay wireless devices operating in a standard or low-powered transmission mode. In an exemplary embodiment, the high power class enables a maximum uplink transmission power level of 26 dBm, and a standard (or low) power class enables a maximum uplink transmission power level of 23 dBm. Thus, a backhaul connection for high-powered relay wireless devices may utilize a higher maximum uplink transmission power than backhaul connections for standard-powered relay wireless devices, or any other wireless device associated with a lower power class. Further, the high-powered transmission mode of the transmissions from the relay wireless device may cause interference to transmissions from the other standard and low-powered wireless device.

Thus, operations described herein include activating and deactivating the high-powered transmission mode selectively based on an interference level measured by other wireless devices and/or neighboring access nodes to which they are attached. Such measurements of interference may be triggered based on a presence of the high-powered relay wireless device. For example, upon determining that the relay device is assigned a high power class, the access node serving the relay wireless device (i.e. serving access node) may transmit the instruction to measure the interference to one or more of its neighboring access nodes. The neighboring access nodes monitor signal levels of uplink transmissions received thereat, and report high interference levels back to the serving access node. For instance, an interference level is measured of signals transmitted from other wireless devices and received at the one or more neighboring access nodes that are serving said other wireless devices. Alternatively, the interference may be measured at the other wireless devices and communicated with the neighboring access nodes. For example, the measurement may be based on a received signal strength indicator (RSSI) of uplink transmissions received at the neighboring access nodes. Further, each neighboring access node may further be configured (or instructed) to determine that the measured interference level meets or exceeds a threshold interference level, and notify the serving access node of excessive interference. Alternatively or on addition, the neighboring access node periodically or continuously reports measured interference levels, and the serving access node performs the comparison with the threshold interference level and determines a presence of excessive interference.

In either case, responsive to a determination of excessive interference, the serving access node deactivates the high-powered transmission mode of the relay wireless device. Deactivating the high-powered transmission mode may include instructing the relay wireless device to utilize a lower transmission power level. For example, deactivating the high-powered transmission mode can include transmitting a lower transmission power level to the relay wireless device in a control message. The lower transmission power level may be the same as a standard transmission power level associated with standard-powered wireless devices, or associated with a lower power class than the high-powered relay wireless device. Further the high-powered transmission mode of the relay wireless device may be reactivated upon determining that subsequently-measured interference levels do not meet the threshold. Communication of instructions and indicators/reports between serving and neighboring access nodes may be enabled by a direct communication link between the access nodes, such as an X2 link. For example, the instruction to monitor the signal level may be transmitted from the serving access node to the neighboring access nodes via the X2 link, and the indicator of the low signal level or interference is received at the serving access node from the neighboring access nodes also via the X2 link. Alternatively or in addition, a network node, such as a controller node, may be configured to communicate instructions and receive/request information from each access node within the wireless network. For example, a processing node coupled to a controller node or an access node may be configured to perform the disclosed operations. These and other embodiments are further described herein and with reference to FIGS. 1-9.

Figure 1:
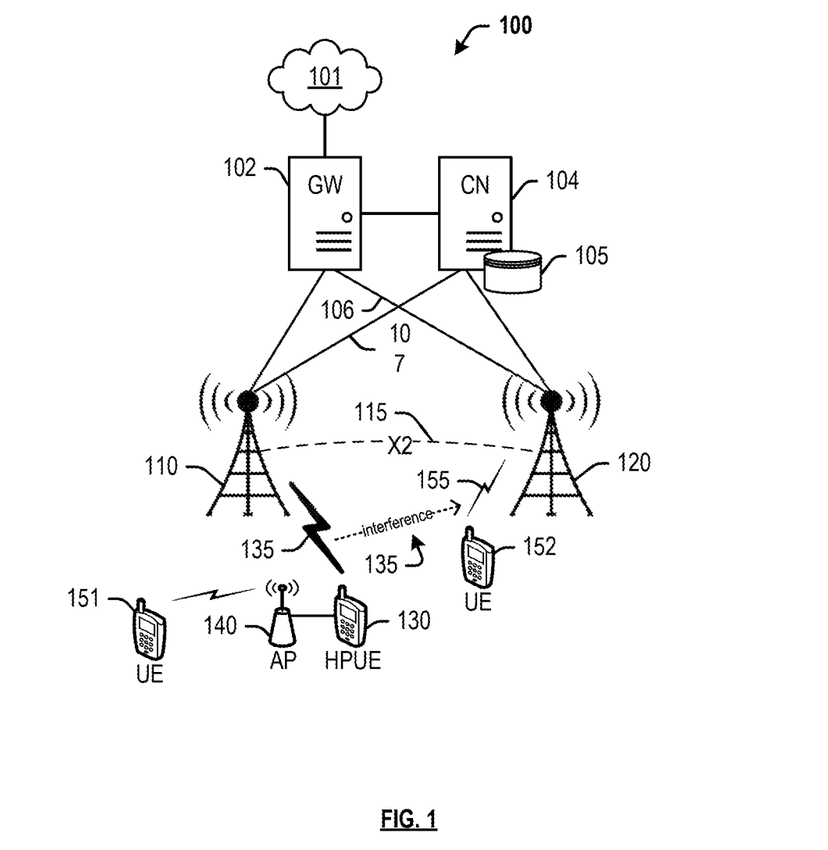
FIG. 1 depicts an exemplary system for minimizing interference caused by high-powered relay wireless devices.

FIG. 1 depicts an exemplary system 100 for minimizing interference in a wireless network. System 100 comprises a communication network 101, gateway 102, controller node 104, access nodes 110 and 120, a relay device comprising high-powered wireless device (HPUE) 130 coupled to access point (AP) 140, and end-user wireless devices 151 and 152. High-powered wireless device 130 (hereinafter referred to as a relay wireless device) is illustrated as accessing network services from access node 110 (hereinafter referred to as a serving access node), and relaying the network services via access point 140 to wireless device 151. Relay wireless device 130 communicates with access node 110 via a communication link 135, which provides a "backhaul" for data transmitted to and from wireless device 151 via access point 140. Further, access point 140 deploys a radio air interface (of the same or different frequency from backhaul 135) for enabling wireless device 151 to attach to access point 140. Components and features of relay wireless device 130 and access point 140 are further described with reference to FIG. 3. Further, wireless device 152 is illustrated as being in direct communication with access node 120 over communication link 155. It should be noted that although only access nodes 110, 120, relay wireless device 130, access point 140, and wireless devices 151, 152 are illustrated in system 100, additional access nodes, relay devices, and wireless devices may be contemplated by those having ordinary skill in the art in light of this disclosure.

Relay wireless device 130 is further depicted as being a high-powered wireless device (HPUE), thus utilizing a higher transmission power to communicate over backhaul communication link 135 than other wireless devices. For example, relay wireless device 130 may be assigned a higher transmission power class, such as power class 1 or 2, as compared with wireless device 152, which may be assigned a standard or low transmission power class, such as power class 3 or 4. The high power class enables relay wireless device 130 to operate in a high-powered transmission mode, which utilizes a higher transmission power for uplink data transmitted over backhaul communication link 135 than a transmission power utilized by wireless device 152 to transmit uplink data over communication link 155. Such a higher power class may be assigned to relay wireless device 130 to enable relay wireless device 130 to communicate with access node 110 over a longer distance than other standard or low-powered wireless devices. In an exemplary embodiment, the high power class enables a maximum uplink transmission power level of 26 dBm, and a standard (or low) power class enables a maximum uplink transmission power level of 23 dBm. Further (and as described with reference to FIG. 3), relay wireless device 130 may be equipped with appropriate transceivers and antennae to enable operation in a high-powered transmission mode.

Moreover, as a consequence of operating in a high-powered transmission mode, an interference 135 may be caused to other standard-powered wireless devices such as wireless device 152. Thus, operations described herein include minimizing interference 135 by selectively activating and deactivating a high-powered transmission mode of relay wireless device 130 based on measurements of interference 135 performed at one or both of wireless device 152 and access node 120. For example, serving access node 110 may determine the power class of relay wireless device 130 based on, for instance, an attach request received at serving access node 110 from relay wireless device 130. In response, to identifying the higher power class of relay wireless device 130, serving access node 120 may transmit an instruction to neighboring access node 120 (along with other neighboring access nodes not illustrated herein) to measure the interference caused to any uplink transmissions received from standard-powered wireless devices, such as wireless device 152. Neighboring access node 120 monitors signal levels of uplink transmissions received via communication link 155, and reports high interference levels back to serving access node 110. For instance, an RSSI may be measured of signals received over communication link 155, and the measured RSSI level is indicative of an effect of interference 135 on communication link 155. Upon determining that the measured RSSI (or interference level) meets or exceeds a threshold, neighboring access node 120 may notify or transmit to serving access node 110 an indicator of excessive interference.

Alternatively or on addition, neighboring access node 120 periodically or continuously reports measured interference (or RSSI) levels, and serving access node 110 compares the reported levels with the threshold to determine a presence of excessive interference 135. In either case, responsive to a determination of excessive interference 135, serving access node 110 deactivates the high-powered transmission mode of relay wireless device 130. Deactivating the high-powered transmission mode may include instructing relay wireless device 130 to utilize a lower transmission power level. For example, deactivating the high-powered transmission mode can include transmitting a lower maximum transmission power level to relay wireless device 130 in a control message. The lower maximum transmission power level may be the same as a standard maximum transmission power level associated with standard-powered wireless devices, or associated with a lower power class than high-powered relay wireless device 130, such as wireless devices 151, 152.

Communication of instructions and indicators/reports between serving access node 110 and neighboring access node 120 may be enabled by X2 communication link 115, which is a direct communication link between access nodes 110, 120. For example, the instruction to monitor the signal level may be transmitted from serving access node 110 to neighboring access node 120 via X2 communication link 115, and the indicator of the low signal level or interference is received at serving access node 110 from neighboring access node 120 also via X2 link 115. This enables low-latency and real-time transmission power control of high-powered relay wireless devices within system 100. For example, the high-powered transmission mode of relay wireless device 130 may be reactivated upon determining that subsequently-measured interference levels of interference 135 do not meet the threshold. In addition, controller node 104 may be configured to communicate instructions and receive/request information from each access node 110, 120, and to transmit instructions and receive information as described herein.

Access nodes 110, 120 can be any network node configured to provide communication between wireless devices 130, 151, 152 and communication network 101, including standard access nodes and/or short range, low power, small access nodes. For instance, access nodes 110, 120 may include any standard access node, such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. In another embodiment, access nodes 110, 120 can be a small-cell access node including a microcell access node, a picocell access node, a femtocell access node, or the like such as a home NodeB or a home eNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with other access nodes (not shown) using a direct link similar to X2 link 115. Components of exemplary access nodes are further described with reference to FIG. 2.

Wireless devices 130, 151, 152 may be any device, system, combination of devices, or other such communication platform capable of communicating wirelessly with access nodes 110, 120 using one or more frequency bands deployed therefrom. Each of wireless devices 130, 151, 152 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible. In some embodiments, relay wireless device 130 includes stronger computational & radiofrequency capabilities than standard-powered wireless devices 151, 152, as well as a directional antenna, and dedicated power supply, so that it can sustain an over-the-air backhaul link 135 for at least wireless device 151 attached to access point 140. Components of exemplary relay devices (such as relay wireless device 130 and access point 140) and transmission power capabilities thereof are further described with reference to FIGS. 3-4.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 151, 152. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as locations, power class assignments, and transmission mode capabilities of relay wireless device 130 and end-user wireless devices 151, 152, presence and transmission power allowances of access nodes 110, 120, interference measurements, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the interference minimization operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Figure 2:
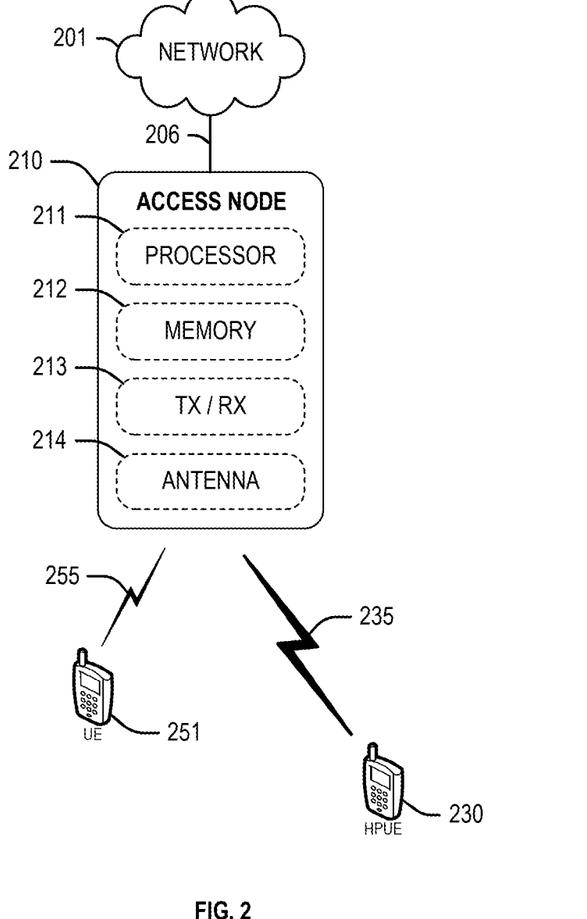
FIG. 2 depicts an exemplary access node.

FIG. 2 depicts an exemplary access node 210 for minimizing interference. Access node 210 may comprise, for example, a macro-cell or a small-cell access node, such as access node 110 described with reference to FIG. 1. Access node 210 provides wireless devices 230, and 251 with access to network services and applications on network 201. Access node 210 is illustrated as comprising a processor 211, memory 212, transceiver 213, and antenna 214. Processor 211 executes instructions stored on memory 212, while transceiver 213 and antenna 214 enable communication with wireless devices 230, 251 over communication links 235, 255, respectively. Instructions stored on memory 212 can include minimizing interference caused by high-powered transmissions 235 to standard or low-powered transmissions 255, as further described herein. For example, the instructions include selectively activating and deactivating a high-powered transmission mode of high-powered relay wireless devices 230. The power class may be obtained from an attach request received at access node 210 from high-powered relay wireless device 230. Upon determining that high-powered relay wireless device 230 is assigned a high power class, access node 210 may transmit an instruction to all neighboring access nodes to measure any interference caused to uplink signals received at said neighboring access nodes. The neighboring access nodes monitor signal levels of uplink transmissions received thereat, and report high interference levels back to the serving access node 210. Responsive to a determination of excessive interference, serving access node 210 deactivates the high-powered transmission mode of high-powered relay wireless device 230. Deactivating the high-powered transmission mode may include instructing relay wireless device 230 to utilize a lower transmission power level. For example, deactivating the high-powered transmission mode can include transmitting a lower transmission power level to relay wireless device 230 in a control message. The lower transmission power level may be the same as a standard transmission power level associated with standard-powered wireless devices or associated with a lower power class than the power class of high-powered relay wireless device 230. Further the high-powered transmission mode of the relay wireless device may be reactivated upon determining that subsequently-measured interference levels do not meet the threshold.

Figure 3:
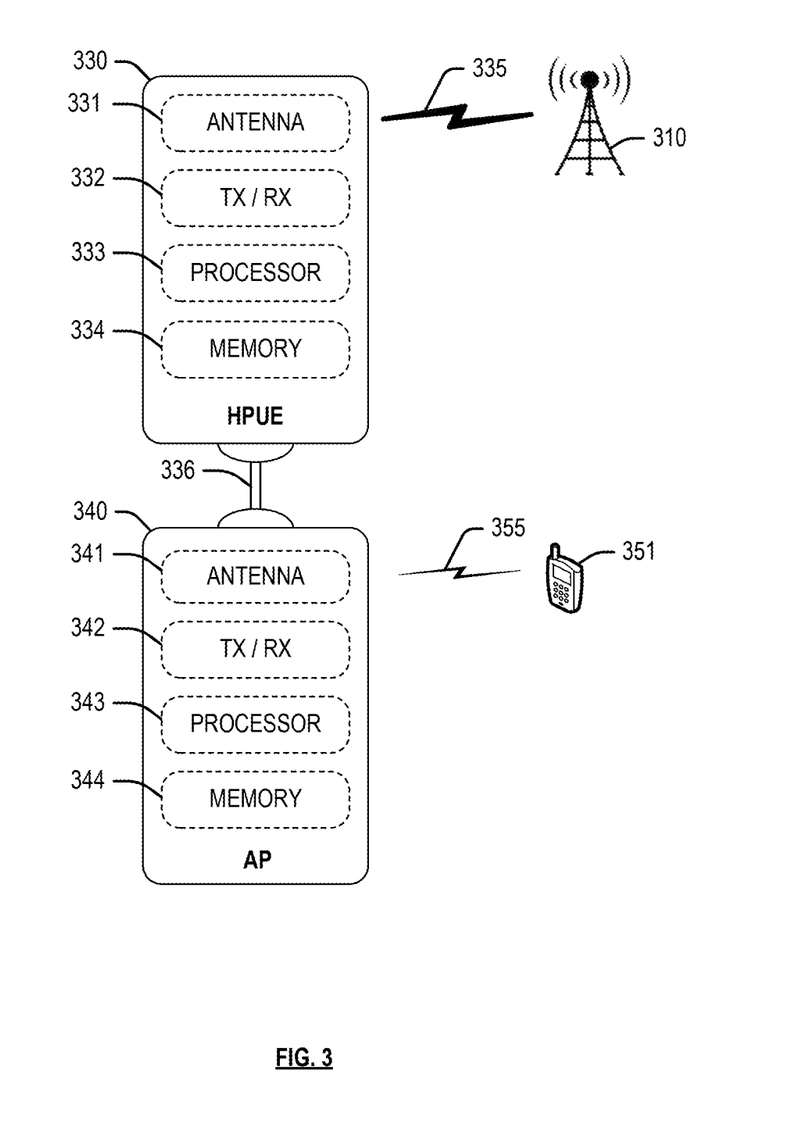
FIG. 3 depicts an exemplary relay device.

FIG. 3 depicts an exemplary relay device comprising a high-powered wireless device (HPUE) 330 and an access point (AP) 340. HPUE 330 is configured for direct (i.e. unrelayed) communication with access node 310 via communication link 355 (i.e., a backhaul connection), and AP 340 is configured to deploy a wireless communication link 355, enabling wireless device 351 to attach to AP 340. AP 340 can be coupled to HPUE 330 via a communication interface 336. Communication interface 336 may be any interface that enables direct communication between HPUE 330 and AP 340, such as USB, FireWire, or any other serial, parallel, analog, or digital interface. Further, HPUE 330 is illustrated as comprising an antenna 331, a transceiver 332, a processor 333, and a memory 334. Similarly, AP 340 is illustrated as comprising an antenna 341, a transceiver 342, a processor 343, and a memory 344. Although only one transceiver is depicted in each of HPUE 330 and AP 340, additional transceivers may be incorporated in order to facilitate communication across interface 336 and other network elements. Further, HPUE 330 may be assigned a higher power class, which enables HPUE 330 to utilize a higher transmission power for transmitting uplink data on backhaul communication link 335, as further described with respect to FIG. 4.

In an embodiment, the relay device depicted in FIG. 3 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 310 (hereinafter "donor access node") are amplified and transmitted to wireless device 351. Likewise, RF signals received from wireless device 351 are amplified and transmitted to donor access node 310. Alternatively or in addition, a layer 2 relay device performs a decode and forward (DF) function. RF signals received from donor access node 310 are demodulated and decoded, then encoded and modulated again before being transmitted to wireless device 351. Likewise, RF signals received from wireless device 351 are demodulated and decoded, then encoded and modulated again before being transmitted to donor access node 310. Alternatively or in addition, a layer 3 relay device also performs a decode and forward function. However, a layer 3 relay device also performs additional processing (such as ciphering and/or data concatenation/segmentation/resassembly). In other words, relay device depicted herein performs demodulation and decoding of the received RF signals (either uplink or downlink), processes received data, then encodes, modulates, and transmits the data to wireless device 351.

Figure 4:
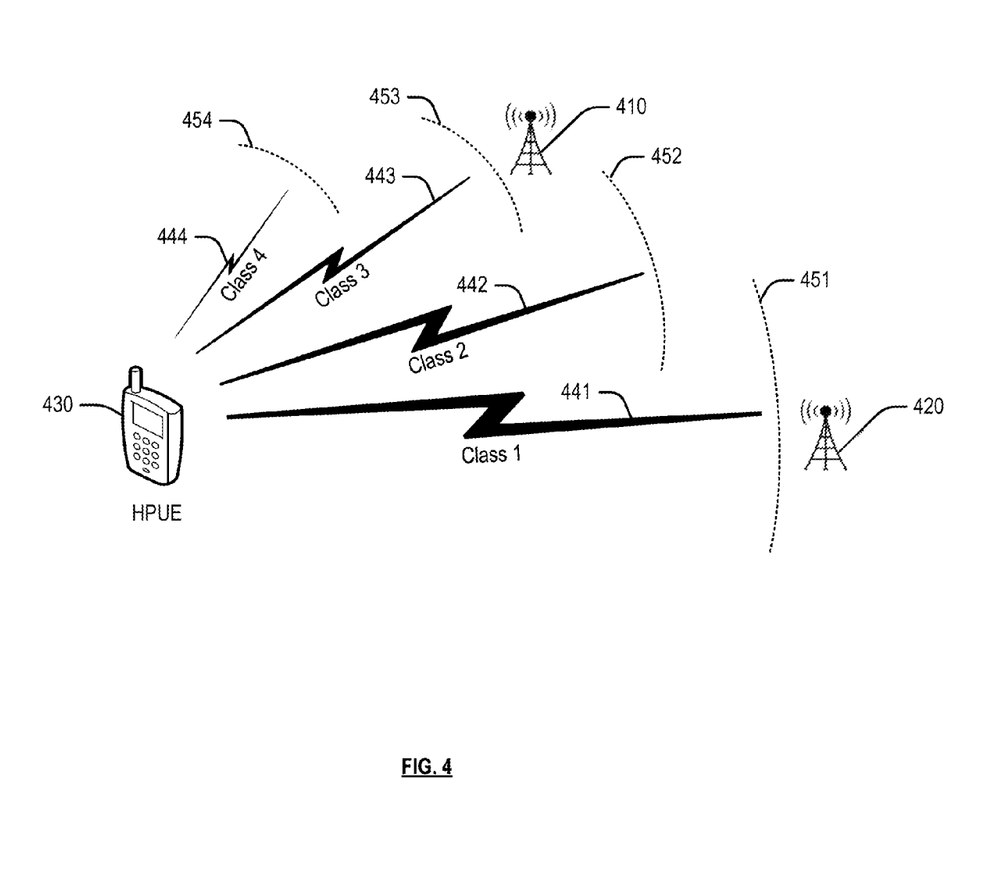
FIG. 4 depicts an exemplary wireless device utilizing a plurality of transmission power classes.

FIG. 4 depicts an exemplary high-powered wireless device 430. As noted above, wireless devices can be configured as different power class wireless devices (e.g., high-powered wireless devices and/or standard-power wireless devices as well as low-power wireless devices). Wireless device 430 is therefore equipped with an appropriate transceivers and antennae (as described with reference to FIG. 3) that enable increased transmission power from wireless device 430 to one or more access node 410, 420. For example, wireless device 430 is capable of operating in a transmission mode utilizing power class 1, which enables uplink transmission 441 at a range 451. Wireless device 430 may further switch transmission modes to utilizing power class 2 to transmit uplink transmission 442 at a range 452, utilizing power class 3 to transmit uplink transmission 443 at a range 453, and utilizing power class 4 to transmit uplink transmission 444 at a range 454. The range of the uplink transmissions 441-444 can affect an effective coverage area of access nodes 410, 420. For example, the effective coverage area of an access node, such as one of access nodes 410, 420, can be limited by an amount of power available to wireless device 430. Thus, when wireless device 430 operates in a high-powered transmission mode, it can communicate with access nodes from a longer distance than standard-power wireless devices. For example, when wireless device 430 is assigned power class 3, uplink transmission 443 is transmitted at a power level that enables communication with access node 410 at range 453. To communicate with access node 420, which is further away from wireless device 430 (i.e. at range 451), wireless device 430 may be assigned power class 1, which enables a higher-powered uplink transmission 441. This may be particularly useful if wireless device 430 is configured as a relay wireless device for relaying services from access node 420 to other wireless devices, as described herein.

Consequently, real-time adjustment of the power classes of wireless devices such as wireless device 430 can be performed by network operators to increase the effective coverage area of their access nodes, enabling more consumers will to use a given access node. Moreover, controlling the transmission power level or changing the power class of wireless device 430 can be performed by setting a maximum uplink transmission power value allowed by a serving access node to be equal to a standard maximum uplink transmission power value associated with standard-powered wireless devices, and broadcasting the standard maximum uplink transmission power value to wireless device 430 via a system information message such as, for example, a downlink control indicator (DCI) message.

Figure 5:
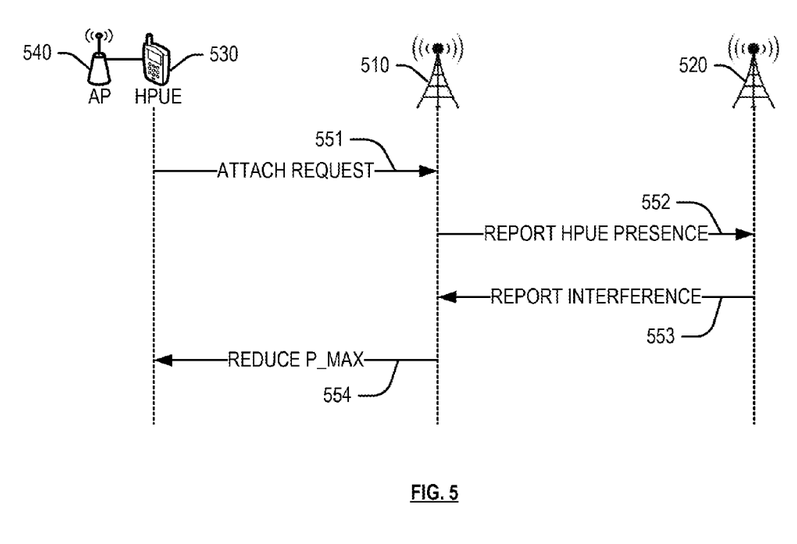
FIG. 5 depicts an exemplary network flow for minimizing interference caused by a high-powered relay wireless device.

FIG. 5 depicts an exemplary network flow for minimizing interference caused by a high-powered relay wireless device comprising HPUE 530 and AP 540. HPUE 530 and AP 540 may be considered equivalent to high-powered relay wireless device 130 and access point 140 in FIG. 1, respectively.

Similarly, access nodes 510 and 520 may be considered equivalent to access nodes 110 and 120 in system 100. Other network elements may be present to facilitate communication but are omitted for clarity, such as controllers, gateways, and physical and/or wireless data links for carrying data among the various network elements. For example, communication of instructions and indicators/reports between access nodes 510, 520 may be enabled by a direct communication link between the access nodes, such as an X2 link. Alternatively or in addition, a network node, such as a controller node, may be configured to communicate instructions to and receive/request information from each access node 510, 520.

The network flow begins at 551, when HPUE 530 initiates a connection with access node 510 (hereinafter, "serving access node") via an attach request message. The attach request message includes a power class indicator of HPUE 530, which enables donor access node 510 to provide a maximum transmission power corresponding to the power class indicator. Since HPUE 530 may be configured to relay data between donor access node 510 and an end-user wireless device via a backhaul connection, HPUE may be assigned a high power class and may further be capable of operating in a high-powered transmission mode. In the high-powered transmission mode, a transmission power level for uplink transmissions generated by HPUE 530 can be higher than a maximum transmission power level generated by other wireless devices operating in a standard or low-powered transmission mode. For example, the high power class enables a maximum uplink transmission power level of 26 dBm, whereas a standard (or low) power class enables a maximum uplink transmission power level of 23 dBm.

Further, uplink transmissions utilizing the high-powered transmission mode may cause interference to other standard and low-powered wireless devices as described herein. Thus, access node 510 is configured to minimize the interference by selectively activating and deactivating the high-powered transmission mode of HPUE 530 based on an interference level measured neighboring access node 520. To enable this, upon determining that HPUE 530 is assigned a high power class, donor access node 510 may transmit an indicator 552 to neighboring access node 520, indicating a presence of HPUE 530, as well as providing an instruction to measure an interference of uplink signals received at neighboring access node 520.

In response to the instruction, neighboring access node 520 monitors signal levels of uplink transmissions received thereat, and reports any high interference levels back to donor access node 510 at 553. For example, each neighboring access node may be configured (or instructed at 552) to determine that the measured interference level meets or exceeds a threshold interference level, and notify the serving access node of excessive interference at 553. Alternatively or on addition, neighboring access node 520 may be configured to periodically or continuously report measured interference levels back to donor access node 510. In either case, the interference may be related to signals transmitted from other wireless devices (not shown) and received at neighboring access node 520. The interference may be measured at the other wireless devices and communicated with neighboring access node 520. The measurement may be based on a received signal strength indicator (RSSI) of uplink transmissions received at neighboring access node 520. Alternatively or in addition, the interference level may be represented by a signal-to-interference-plus-noise ratio (SINR) of uplink transmissions received at neighboring access node 520. For example, uplink transmissions from one or more standard-powered wireless devices may include SINR measurements thereof. Alternatively, the SINR may be measured at neighboring access node 510. In either case, standard-powered wireless devices suffering from low SINR may be identified as sources of the corresponding set of noisy transmissions and, thus, subject to high interference levels.

Responsive to receiving an indicator of excessive interference at 553, donor access node 510 deactivates the high-powered transmission mode of HPUE 530. Deactivating the high-powered transmission mode may include transmitting, at 554, an instruction to HPUE 530 to utilize a lower transmission power level. For example, deactivating the high-powered transmission mode can include transmitting a lower maximum transmission power level to HPUE 530 in a control message. The lower maximum transmission power level may be the same as a standard maximum transmission power level associated with standard-powered wireless devices, or associated with a lower power class than the power class of HPUE 530.

Figure 6:
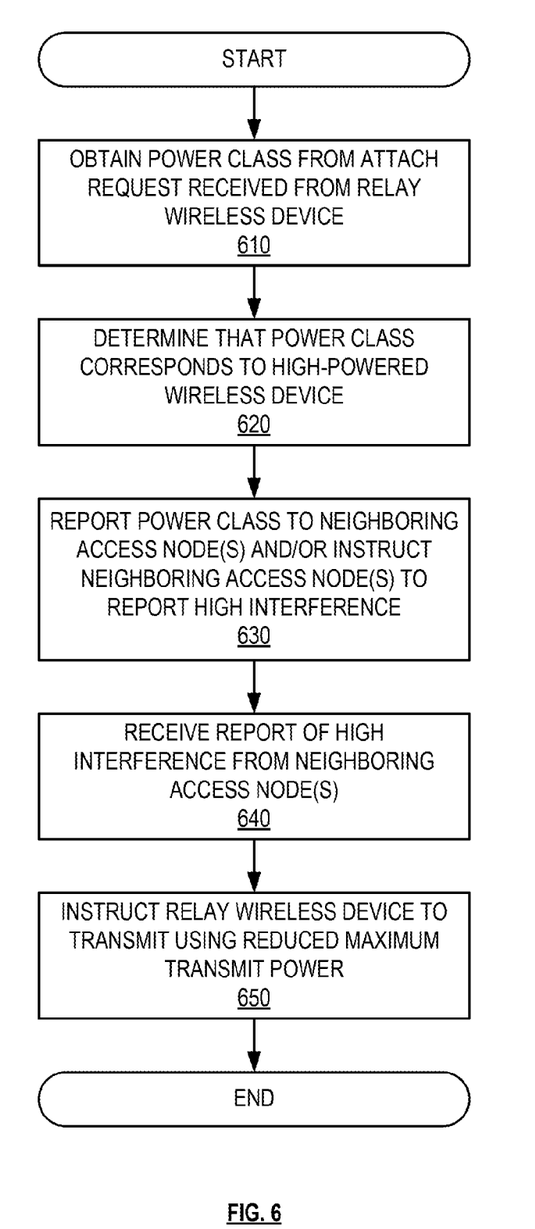
FIG. 6 depicts an exemplary method for minimizing interference caused by a high-powered relay wireless device.

FIG. 6 depicts an exemplary method for minimizing interference caused by a high-powered relay wireless device. The method of FIG. 6 may be implemented by an access node such as access node 110, by a controller node such as controller node 104, or by any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a power class of a high-powered relay wireless device is obtained by a serving access node (or a controller node, as described above). The power class may be identified in an attach request message received at a serving access node from the high-powered relay wireless device. The attach request message includes a power class indicator of the high-powered relay wireless device, which enables the serving access node to provide a maximum transmission power corresponding to the power class indicator. For example, the high power class enables a maximum uplink transmission power level of 26 dBm, whereas a standard (or low) power class enables a maximum uplink transmission power level of 23 dBm. Thus, at 620, it is determined that the power class indicator in the attach request corresponds to a high power class.

Upon determining that the high-powered relay wireless device is assigned a high power class, at 630, the serving access node transmits a report of the power class and/or an instruction to one or more neighboring access nodes to perform or report interference measurements. For example, the power class report may indicate a presence of the high-powered relay wireless device. Alternatively or in addition, an indicator is transmitted that instructs each neighboring access node to measure an interference of uplink signals received at said each neighboring access node. In response to the instruction, each neighboring access node monitors signal levels of uplink transmissions received thereat, and reports any high interference levels back to the serving access node. For example, each neighboring access node may be configured (or instructed at 630) to determine that the measured interference level meets or exceeds a threshold interference level, and notify the serving access node of excessive interference. Alternatively or on addition, each neighboring access node may be configured to periodically or continuously report measured interference levels back to the serving access node. Thus, at 640, a report is received from one or more neighboring access nodes indicating excessive interference measured for uplink signals received thereat.

Upon receiving the report or indicator of high interference, the serving access node deactivates the high-powered transmission mode of the high-powered relay wireless device. Deactivating the high-powered transmission mode may include transmitting, at 650, an instruction to the high-powered relay wireless device to utilize a lower transmission power level. For example, deactivating the high-powered transmission mode can include transmitting a lower maximum transmission power level to the high-powered relay wireless device in a control message. The lower maximum transmission power level may be the same as a standard maximum transmission power level associated with standard-powered wireless devices, or associated with a lower power class than the power class of the high-powered relay wireless device.

Figure 7:
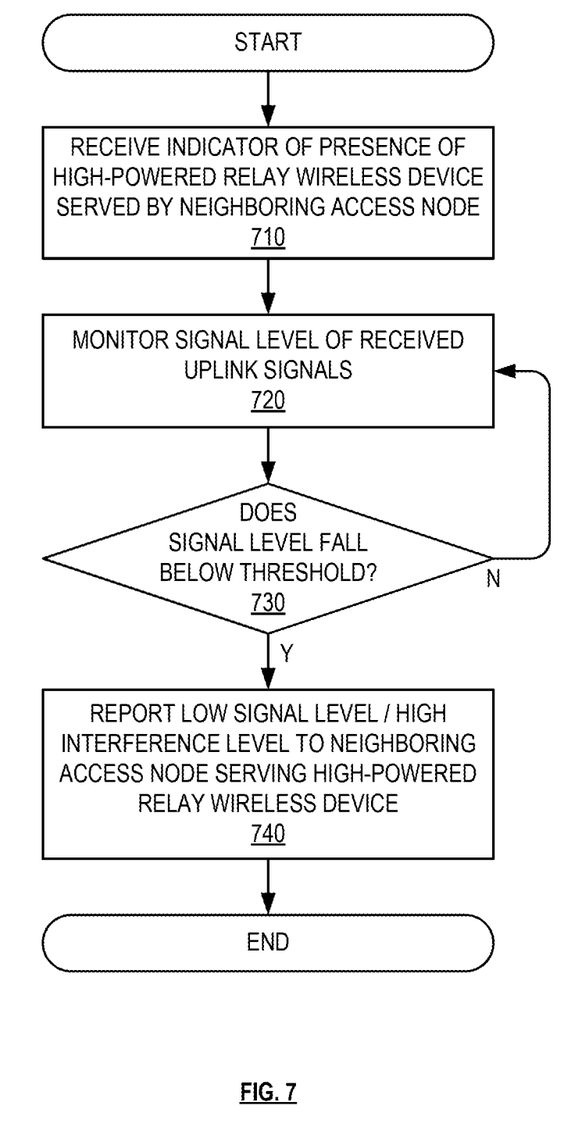
FIG. 7 depicts another exemplary method for minimizing interference caused by a high-powered relay wireless device.

FIG. 7 depicts another exemplary method for minimizing interference caused by a high-powered relay wireless device. The method of FIG. 7 may be implemented by a neighboring access node, such as access node 120, or by any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, an access node receives an indicator of a presence of a high-powered relay wireless device served by a neighboring donor access node serving the high-powered relay wireless device. The indicator may be triggered by the neighboring donor access node determining that a power class of a high-powered relay wireless device (obtained by, for instance, an attach request message) is a high power class. Further, the indicator may be accompanied by an instruction to perform and/or report interference measurements at the access node. Alternatively or on addition, the access node may be configured to perform and report interference measurements upon receiving the indicator of the presence of the high-powered relay wireless device.

In either case, at 720, interference levels are monitored of uplink signals received at the access node. The interference measurements may be based on a received signal strength indicator (RSSI) of uplink transmissions received at the access node. Alternatively or in addition, the interference level may be represented by a signal-to-interference-plus-noise ratio (SINR) of uplink transmissions received at the neighboring access node. In either case, at 730, it is determined whether or not the interference level (represented by the RSSI or SINR or any other metric) meets a threshold. If not, the monitoring continues at 720. However, if high interference levels are detected, the neighboring donor access node serving the high-powered relay wireless device is notified at 740. Upon receiving the report or indicator of high interference, the donor access node deactivates the high-powered transmission mode of the high-powered relay wireless device as described herein.

In alternate embodiments, rather than determining that the measured interference level meets or exceeds a threshold interference level at 730, the access node may be configured to periodically or continuously report measured interference levels, and the serving access node performs the comparison with the threshold interference level and determines a presence of excessive interference. Further, the methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access nodes 110, 120, controller node 104, and/or network 101.

Figure 8:
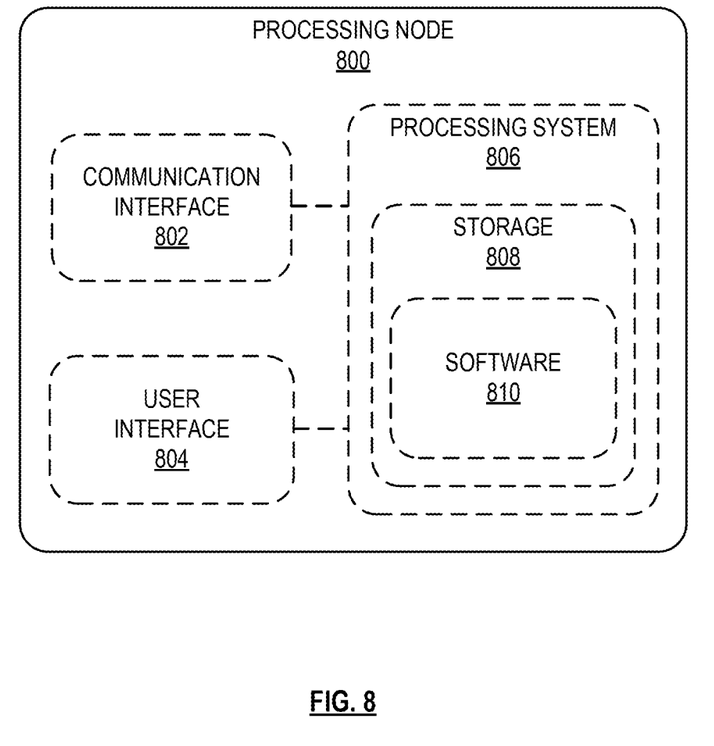
FIG. 8 depicts an exemplary processing node for minimizing interference in a wireless network.

FIG. 8 depicts an exemplary processing node for controlling a transmission power of wireless devices in a wireless network. Processing node 800 comprises a communication interface 802, user interface 804, and processing system 806 in communication with communication interface 802 and user interface 804. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. For example, storage 808 may include a buffer. Software 810 may include computer programs, firmware, or some other form of machine-readable instructions, including an operating system, utilities, drivers, network interfaces, applications, or some other type of software. For example, software 810 may include a module for performing transmission power control operations described herein. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for minimizing interference in a wireless network, the method comprising:
   determining that a relay wireless device is operating in a high-powered transmission mode, wherein the relay wireless device is coupled to an access point and is configured to relay data between a serving access node and a first end-user wireless device attached to the access point;
   receiving, from a neighboring access node in communication with the serving access node, an indicator of interference associated with uplink signals received at the neighboring access node from a second end-user wireless device attached to the neighboring access node, the interference being caused to the uplink signals by the relay wireless device; and
   instructing the relay wireless device to switch from a high-powered transmission mode to a standard-powered transmission mode,
   wherein the high-powered transmission mode utilizes a first transmission power level that is associated with a high power class, and
   wherein the standard-powered transmission mode utilizes a second transmission power level that is lower than the first transmission power level.

2. The method of claim 1, wherein determining that the relay wireless device is operating in the high-powered transmission mode comprises:
   identifying a power class of the relay wireless device; and
   determining that the power class is the high power class.

3. The method of claim 2, wherein the power class is transmitted to the serving access node in an attach request from the relay wireless device.

4. The method of claim 1, further comprising transmitting the second transmission power level to the relay wireless device in a control message.

5. The method of claim 1, wherein the second transmission power level is associated with a low power class.

6. The method of claim 1, further comprising instructing the neighboring access node to:
   monitor an interference level of the received uplink signals; and
   transmit the indicator of interference to the serving access node when the interference level meets a threshold.

7. The method of claim 6, wherein the interference level comprises a receive signal strength indicator (RSSI) of the one or more uplink signals.

8. The method of claim 1, further comprising:
   determining that a subsequent interference level of uplink signals subsequently received at the neighboring access node does not meet the threshold; and
   activating the high-powered transmission mode of the relay wireless device.

9. A system for minimizing interference in a wireless network, the system comprising:
   a first access node;
   a second access node communicably coupled to the first access node;
   a relay wireless device attached to the first access node;
   an access point communicably coupled to the relay wireless device; and
   a processor coupled to the first access node, the processor for configuring the first access node to perform operations comprising:
   determining that the relay wireless device is assigned a high power class that enables a high uplink transmission power level;
   transmitting an instruction to the second access node to monitor a signal level of uplink transmissions received at the second access node from one or more end-user wireless devices attached to the second access node;
   receiving, from the second access node, an indicator of a low signal level of uplink signals received at the second access node from said one or more end-user wireless devices, the low signal level being caused by interference to the uplink signals from the relay wireless device; and
   transmitting an instruction to the relay wireless device to switch from using the high uplink transmission level to using a low uplink transmission level.

10. The system of claim 9, wherein the second access node is communicably coupled to the first access node via a direct communication link.

11. The system of claim 10, wherein the direct communication link comprises an X2 link.

12. The system of claim 11, wherein the instruction to monitor the signal level is transmitted to the second access node via the X2 link.

13. The system of claim 11, wherein the indicator of the low signal level is received from the second access node via the X2 link.

14. The system of claim 9, wherein the determination that the relay wireless device is assigned the high power class is based on an attach request received at the first access node from the relay wireless device.

15. The system of claim 14, wherein the instruction to utilize the low uplink transmission level is transmitted to the relay wireless device in a control message from the first access node.

16. The system of claim 9, wherein the high uplink transmission level comprises 26 dBm and the low uplink transmission level comprises 23 dBm.

17. A processing node for minimizing interference in a wireless network, the processing node being configured to perform operations comprising:
   identifying a high-powered relay device attached to a first access node;
   instructing a second access node to report interference caused by the high-powered relay device to uplink transmissions received at the second access node from wireless devices attached to the second access node;
   receiving an indicator of interference from the second access node when the interference meets a threshold; and
   instructing the high-powered relay device to switch from using a high-powered transmission mode to using a standard-powered transmission mode,
   wherein using the standard-powered transmission mode reduces a maximum transmission power of the high-powered relay device.

18. The processing node of claim 17, wherein identifying the high-powered relay device comprises obtaining a power class from an attach report transmitted by the high-powered relay device.

* * * * *